Jan. 12, 1932.　　　H. A. HICKS　　　1,840,902
AIRPLANE
Filed April 6, 1931　　　3 Sheets-Sheet 2
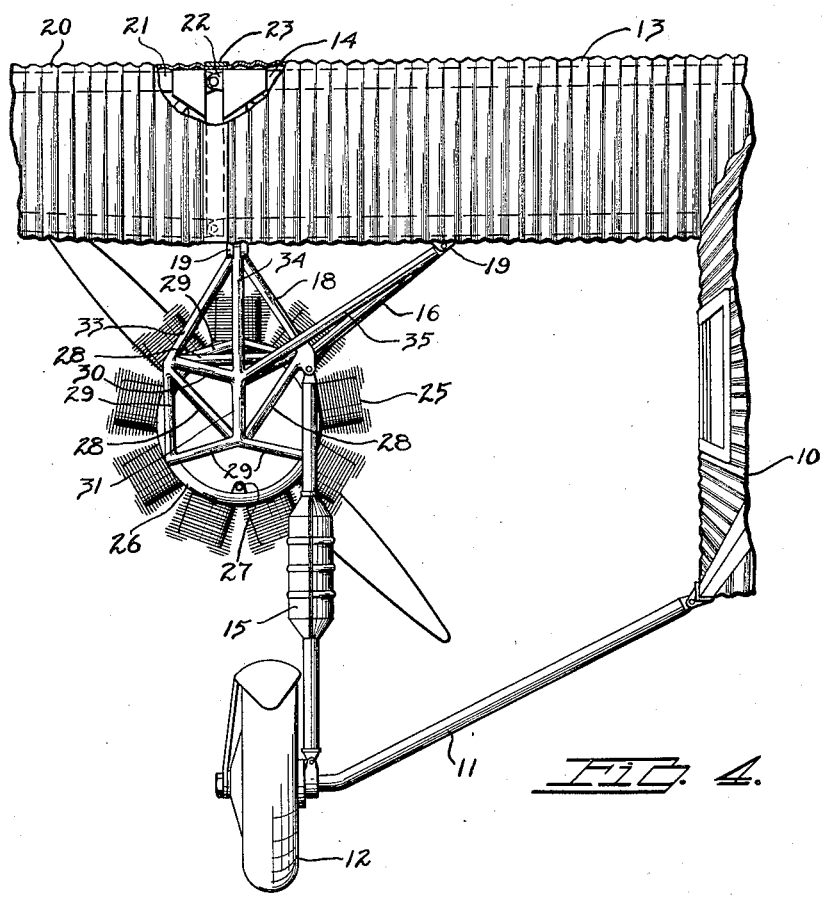
INVENTOR.
H. A. Hicks.
BY
ATTORNEY.
Witness.
E. C. McRae.

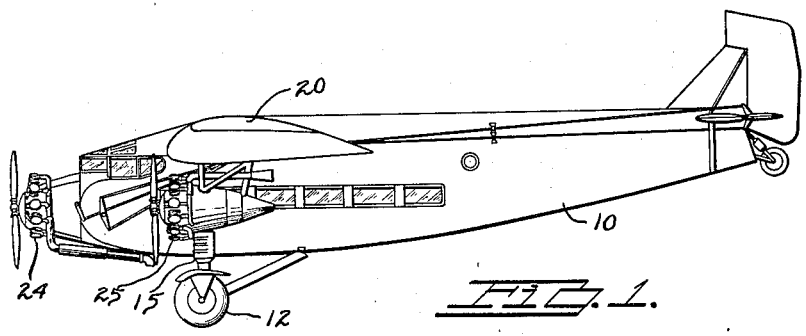
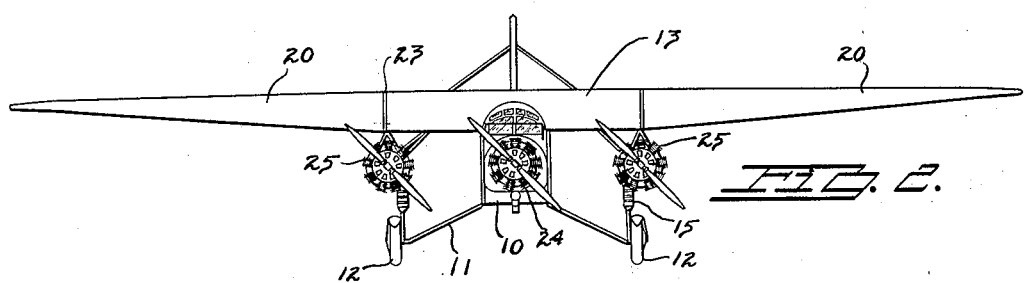
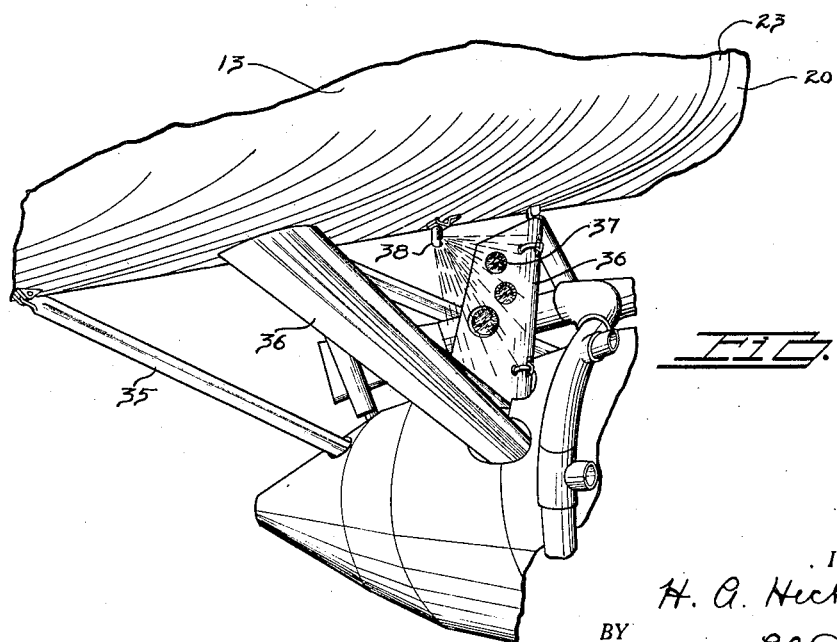

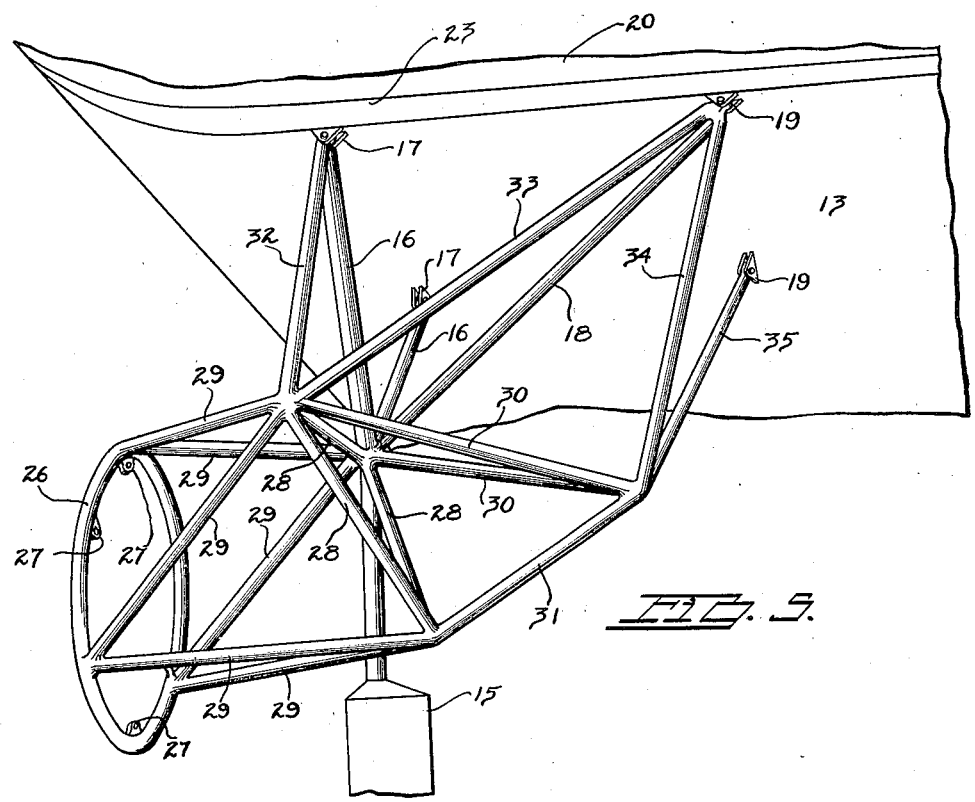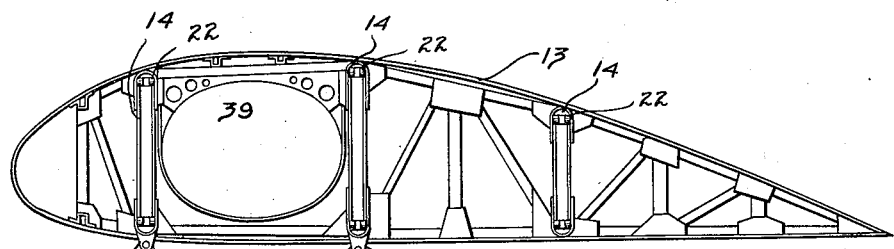

Patented Jan. 12, 1932

1,840,902

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE

Application filed April 6, 1931. Serial No. 528,128.

The object of my invention is to provide an airplane of novel construction, particular reference being had to the wing structure, the absorption of the landing wheel stresses and the structural framework of the outboard engine nacelles. The plane shown herein is of the three engined high wing monoplane type, commonly called transport planes, inasmuch as the improvements disclosed herein are especially adapted for use on this type of plane.

More specifically, the object of my invention is to provide an airplane having a solid center wing section forming a part of the fuselage to which detachable wings may be conveniently fastened to form the complete wing. In the larger type airplanes it has been customary to rotatably mount the landing wheels on axles extending outwardly from each side of the airplane fuselage. Shock absorbers extend upwardly from these axles to the under side of the wing, one on each side of the fuselage, so that the loads on the landing wheels are transmitted directly to the lifting surface of the plane. This is a desirable arrangement but, due to the great loads occurring when the plane is landing, the wings must be secured to the fuselage by means of excessively heavy joints to absorb this landing load. The improved structure shown herein consists of a fuselage having a solid center wing section rigidly secured to the upper portion of the fuselage and extending outwardly a considerable distance on each side thereof so that the upper ends of such shock absorbers may be secured directly to the ends of this solid center section. The wings proper are detachably secured to the ends of this solid center section so that the maximum stress on the wing joints is never greater than the lifting load of the wings.

A further advantage gained by the use of my solid center section arises in the case of three engined planes wherein the outboard engines may be suspended directly from the ends of this center wing section to thereby carry the weight of these engines directly on the landing wheels of the plane. Still further, in such planes the fuel tanks may be housed within this center wing section so that the pipe lines which extend therefrom down to the various motors need not be disturbed in case the plane is taken down for storage or transport.

Still a further object of my invention is to provide a novel structure for distributing the loads of the landing wheels to various points on the under surface of the wing. The upper ends of my shock absorbers, instead of directly bearing against the wing, as in the conventional airplane, terminate in crowfoot fittings from which a plurality of diverging struts extend to the various structural spars of the center wing. The landing load is thereby distributed to the several spars so that not only a lighter spar construction is permitted, but also the weight of the wing ribs may be lessened. I am enabled to so lighten these ribs that ample space within this wing section is provided for all the fuel tanks which space is not to be had with the excessive diagonal bracing formerly required.

Still a further object of my invention is to provide an outboard engine nacelle structure whereby the outboard engines are suspended beneath the under surface of the wing in position forwardly from its leading edge, which structure will be exceptionally strong and light to effectively resist the torque of the motor and the thrust of the propeller. My improved structure is so designed that it may be efficiently streamlined and also proportioned so that the various engine accessories within the nacelle are easily accessible for adjustment or repair.

Still a further object of my invention is to provide streamlined fairings for the engine nacelle struts, one of which fairings will have the instruments associated with the adjacent engine secured therein so as to be visible from the pilot's cockpit. In order to illuminate these instruments I provide a light projecting from the under side of the wing which directs rays down upon these instruments so that they will be visible at night. With this arrangement I am enabled to eliminate the numerous cables which heretofore have extended from each of the outboard engines up through the wings to the main instrument board, which cables were always subject to damage and for this reason liable to failure.

With these and other objects in view my invention consists in the arrangement, construction, and combination of the various parts of my improved device, as described in the specification, claimed in my claims, and illustrated in the accompanying drawings, in which:

Figure 1 shows a side elevation of an airplane, constructed according to the invention disclosed herein.

Figure 2 shows a front elevation of the airplane, shown in Figure 1.

Figure 3 shows a perspective view of one of the outboard engine nacelles, shown in Figures 1 and 2, particular reference being had to the instruments mounted in the strut fairings.

Figure 4 shows a rear view of the landing gear, illustrating the means whereby the landing gear load is distributed over the under surface of the wing, the streamlining and various fairings being removed to illustrate the construction.

Figure 5 shows a perspective view of the framework of my novel engine nacelle structure, and Figure 6 shows an end view of my center wing section, illustrating the means for distributing the landing load thereto.

Referring to the accompanying drawings, I have used the reference numeral 10 to indicate generally an airplane fuselage of the cabin type, all-metal construction. This fuselage is of rectangular section and streamlined in the conventional manner. A pair of axles 11 are pivotally secured to the lower opposite corners of the fuselage and extend outwardly where wheels 12 are rotatably mounted on the outer ends thereof, the wheels thus being permitted to swing in a vertical plane.

Fixedly secured to the upper portion of the fuselage, I have provided a continuous center wing section 13 which projects outwardly from each side thereof to a point just above the landing gear wheels 12. The cross section of this center portion has the conventional wing contour so as to form substantially one-third of the lifting surface of the plane, this surface being formed around three main wing spars 14 which extend from end to end through the section and which form the back-bone of the plane.

A pair of vertical shock absorbing struts 15 are secured to the axles 11 just inside of the wheels 12 and extend upwardly to position spaced beneath the under surface of the center wing section. The upper ends of these struts are each pivotally secured to the lower ends of a pair of diverging struts 16, the upper ends of which are secured to spaced fittings 17 which project from the lower edges of the wing spars 14. It will be noted that the upper ends of the struts 16 are spaced a considerable distance apart to thereby better distribute the load to the wing spars. A third strut 18 extends upwardly from the upper end of each shock absorber strut 15 in a rearwardly diagonal direction and is secured to a fitting 19 which projects from the underside of one of the rear wing spar members. It will thus be seen that the landing load is taken from the wheels 12 through the shock absorber struts 15 and then distributed to the main wing spar members of the center wing section. The novel feature of this construction is the absence of diagonal bracing between the wing spars thereby making possible the installation of fuel tanks 39 in the wing section. This construction is illustrated in Figure 6.

The broad idea of supporting the fuselage from the wing is not claimed to be new, nevertheless, the plurality of diverging struts whereby the load from the shock absorbers is distributed to the various wing spars is believed to be new and materially aids in forming a stronger and lighter structure and one in which fuel tanks can be conveniently installed.

Referring to Figure 2, I have provided a pair of wings proper 20 of gradually diminishing section which are each provided with wing spars 21 aligned with the wing spars 14. A plurality of clevis pin joints 22 have their respective halves secured to the upper and lower beams of the wing spars 14 and 21 so that the wings 20 may be detachably secured to the ends of the center portion 13. It will be noted that in order to insert the clevis pins in the joints 22 an appreciable space must be left between the wing 20 and the end of the center portion 13, however, this space is filled in by a flexible metal band 23 which is drawn around the periphery of the wing so that when the wings are assembled a continuous smooth wing section extends from end to end.

From the foregoing it will be readily seen that the landing load of the plane or the upward thrust of the shock absorbers 15 is transmitted only to the center wing section and that the clevis joints 22 are under a maximum stress of only the weight of the wings proper 20. Thus, the clevises and the means for securing them to the wing spars can be of much lighter construction than heretofore while at the same time maintaining the same factor of safety.

In addition to a center engine 24, which is secured to the forward end of the fuselage 10, I have also provided a pair of outboard engines 25 which are suspended beneath the outer ends of the center wing section 13 in position so that the motors lie just forwardly of the wings proper. My improved nacelle for mounting these engines, although very light in weight, is exceptionally strong and so designed that it may be efficiently streamlined. This structure is shown in Figures 4 and 5, in which the engine, oil tanks, and other accessories are eliminated to better illustrate the structure.

The nacelle framework consists of an engine mounting ring 26 having a plurality of tabs 27 extending inwardly therefrom whereby the rear crank case flange of one of the outboard engines may be fastened to this ring. Inasmuch as the engine should project forwardly from the front edge of the wing to secure maximum propeller efficiency, it follows that the bracing members for supporting the engine must extend from the ring 26 both upwardly and rearwardly to the under side of the wing.

Spaced rearwardly from the ring 26, I have provided an inverted triangular member 28 which is composed of three tubes welded together, each of which tubes is also given the reference numeral 28. The ring 26 is supported at three equally spaced points therearound by means of pairs of diverging braces 29 which extend rearwardly from the ring. It will be noted that the rear ends of these braces are welded to the corners of the triangle 28. It will readily be seen that the two pairs of diverging side braces support the radial load of the engine while all three pairs resist the torque of the engine. Thus, the ring 26 is securely held in position forwardly of the triangle 28.

Extending rearwardly from the upper opposite corners of the triangle 28, I have provided a pair of converging tubes 30, the rear ends of which are joined together and to a tube 31 which extends from the lower corner of the triangle 28. The two braces 30, together with the tube 31, may therefore be readily streamlined. The remainder of the supporting structure is used to secure the nacelle portion, just described, in spaced relation beneath the wing. The inside upper corner of the triangle 28 is secured to the upper end of the shock absorber 15 and inasmuch as this end is rigidly held in position by the diverging struts 16 and 18, no further support for this corner of the triangle is necessary. The upper opposite corner of the triangle, however, is supported by a strut 32 which is joined with the upper end of the outwardly extending struts 16 and is thus secured to the front fitting 17. A strut 33, corresponding to the strut 18, extends from the outer corner of the triangle 28 rearwardly and diagonally upward to the rear fitting 17.

In order that triangle 28 may not bend around the upper two corners, a vertical tube 34 extends from the joined ends of the tubes 30 and tube 31 upwardly to the rear fitting 19 thereby rigidly supporting the engine nacelle in position. Finally, a strut 35 extends from the joined ends of the tubes 30 inwardly and upwardly to the wing surface.

It will be readily apparent that all of the braces used in this structure are subject only to tension or compression and that no direct bending loads are placed on any of the members. Thus, comparatively light steel tubing may be used for these braces and still maintain ample strength in the structure. It will further be noted that the structure is composed entirely of triangular members so that the nacelle is resisted against the torque of the motor, the thrust of the propeller and the twisting of the engine around the supporting struts.

Heretofore, such nacelles were constructed of rectangular sections which required four members extending from the engine rearwardly and also a large number of diagonal braces to effectively prevent torsional reaction in the nacelle. A disadvantage of this structure arose because of the inaccessibleness of the motor accessories disposed in the engine nacelle and the excessive weight of the structure. In my improved construction the accessories are much more accessible to thereby make the installation and repair thereof easier.

Referring now to Figure 3, it will be noted that each of the struts which support the engine nacelles are provided with sheet metal fairings, designated generally by the numeral 36, which fairings form an air-foil section for these strut members to lessen the air resistance of the plane. A double function is provided for one of these fairings, in this instance the fairing of the outwardly extending struts 16, which fairing houses the several instruments required for the correct operation of the engine.

The instruments numbered 37 are housed within this fairing so that their dials are visible from the pilot's compartment in the fuselage, the operating cables and wires therefrom extending down through the fairing into the engine nacelle and then to the engine. The faces of these instruments lie flush with the plane of the fairing so that the air-foil section of the fairing is not destroyed. I have provided an electric light 38 which is secured to the under face of the center section 13 for illuminating these instruments at night, which light is provided with a shield similar to an ordinary dash light shield so that the rays from the light are directed upon the instruments. The pilot may thus conveniently see the instruments connected with each of the outboard motors at all times.

Among the many advantages arising through the use of my improved device, it may be well to mention that my airplane may be disassembled so as to be stored in the relatively small space by the removing of the wings proper while at the same time the outboard engines, landing gear, fuel system, and other of the integral parts of the plane need not be touched. This is a decided safety factor as the essential portions of the plane when once assembled in the factory need not be tampered with when putting the plane into service. Further, the wing spars which extend through the center section of my wing are continuous from end to end so that a light structure is easily provided. The landing load being taken directly through the center wing section will be absorbed through continuous spars, and not through the detachable wing joints.

Still further, by distributing the landing loads at the upper ends of the shock absorbers to various positions along each of the several wing spars, I am enabled to eliminate the lateral bracing of the wings so that room is provided to house fuel tanks in the wing, which room would be unavailable if bracing for distributing such loads were placed within the wing.

Still a further advantage results from my novel nacelle structure and mounting. Due to the novel arrangement of the members comprising in this nacelle I am enabled to obtain exceptional strength against torque, thrust and bending loads, while at the same time providing increased accessibility to the various accessories disposed within the nacelle.

Still a further advantage of this structure results in that the instruments for regulating each of the outboard engines are housed in a streamlined fairing, which instruments are visible to the pilot both at night and in the day time.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In an airplane having a fuselage, a pair of landing wheels secured in position below and laterally spaced from the sides of said fuselage, a continuous wing section extending across the upper portion of said fuselage and projecting therefrom to position above said landing wheels, a combined shock absorber and strut extending between each of said wheels and the outer portions of the continuous wing section, and a wing proper detachably secured to each end of said continuous wing section.

2. In an airplane, a fuselage having an axle pivotally secured to each side thereof, which axle extends outwardly and downwardly a substantial distance from the lower corners of the fuselage, a landing wheel rotatably mounted on the end of each axle, a continuous wing section extending across the upper portion of the fuselage and projecting therefrom to position above said landing wheels, a combined shock absorber and strut extending between each of said landing wheels and the outer portions of the continuous wing section, and a wing proper detachably secured to each end of said continuous wing section.

3. In an airplane having a fuselage, a pair of landing wheels secured in position below and laterally spaced from the sides of said fuselage, a continuous wing section extending across the upper portion of said fuselage and projecting therefrom to position above each of the landing wheels, an outboard engine nacelle suspended from each end of the continuous wing section, a strut extending between each of said wheels and the adjacent engine nacelle, and a wing proper detachably secured to the ends of said continuous wing section.

4. In an airplane having a fuselage, a pair of landing wheels secured in position below and laterally spaced from the sides of said fuselage, a continuous wing section extending across the upper portion of said fuselage and projecting therefrom to position above each of the landing wheels, an outboard engine nacelle suspended from each end of the continuous wing section, a combined shock absorber and strut extending between each of said wheels and the adjacent engine nacelle, and a wing proper detachably secured to the ends of said continuous wing section.

5. In an airplane having a fuselage, a wing extending across the top of said fuselage, said wing comprising a pair of longitudinally spaced wing spars, a plurality of diverging struts extending downwardly from said wing spars to positions spaced beneath the wing, an inverted triangular frame work fixedly secured in position by the lower ends of said struts, an engine mounting ring disposed forwardly of said triangular frame work, and a plurality of braces extending from the corners of said triangle forwardly to said ring, whereby the ring will be fixedly secured in position spaced beneath and forwardly of said wing.

6. In an airplane having a fuselage, a wing extending across the upper portion of said fuselage, said wing comprising a par of longitudinally spaced wing spars, a plurality of diverging struts extending downwardly from said wing spars to positions spaced beneath said wing, an inverted triangular frame work fixedly secured in position by the lower ends of said struts, an engine mounting ring disposed forwardly of said triangular frame work, and pairs of diverging braces extending from each corner of said frame work to said engine ring, the forward end of one of each pair of braces intersecting the ring adjacent to the intersection of a brace forming one of the other pairs, whereby the engine supporting ring will be fixedly secured in position spaced beneath and forwardly of said wing.

7. In an airplane having a fuselage, a wing extending across the top of said fuselage, a pair of outboard engines suspended beneath said wings in position spaced from each side of said fuselage, strut members supporting said engines, streamline fairings for said struts, and a plurality of instruments disposed in said fairings and having their faces flush therewith, said instruments being situated so as to be visible from the forward portion of said fuselage.

HAROLD A. HICKS.